A. M. NELSON.
TANK CAR.
APPLICATION FILED MAY 19, 1922.
1,429,685.
Patented Sept. 19, 1922.
3 SHEETS—SHEET 1.
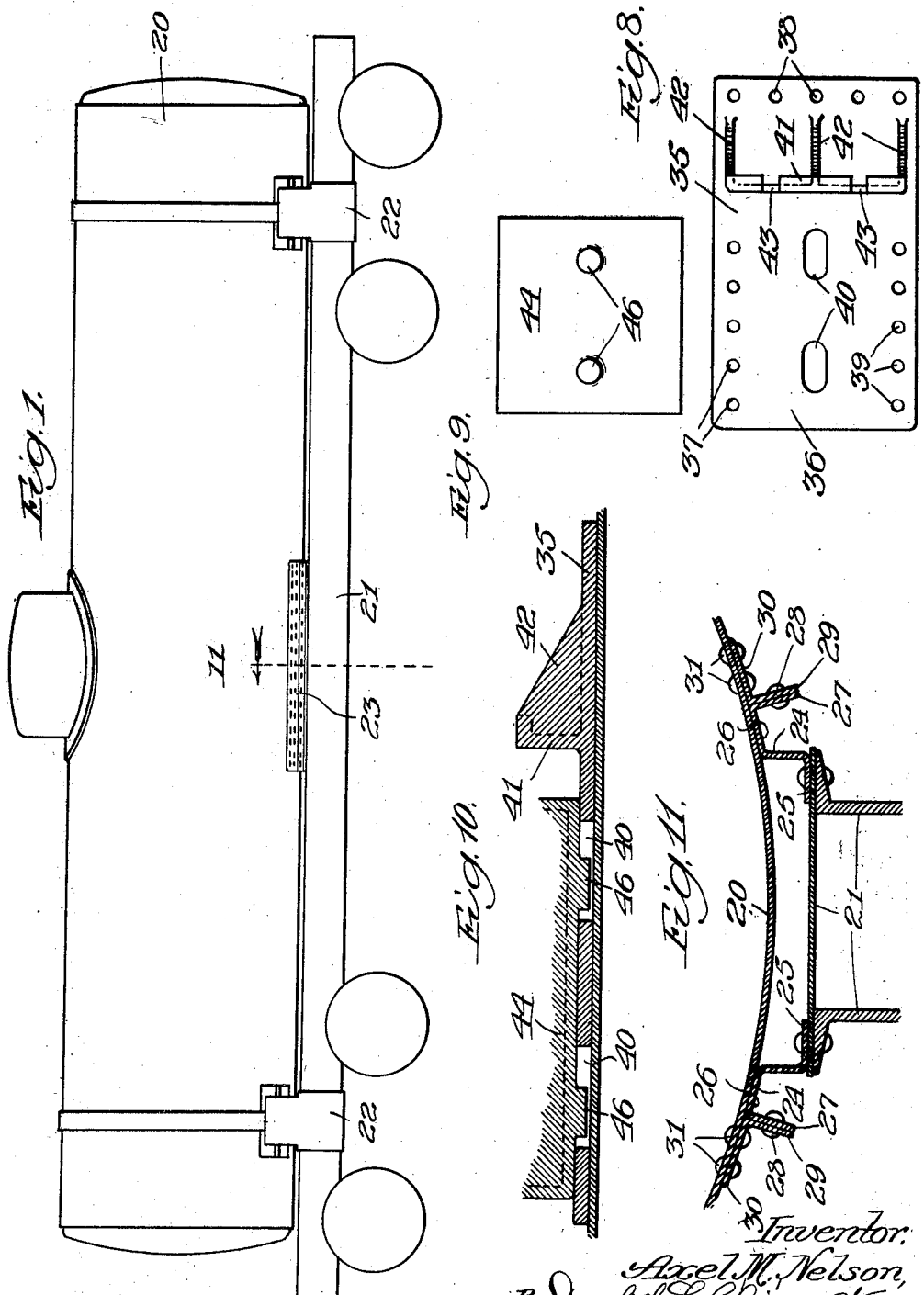

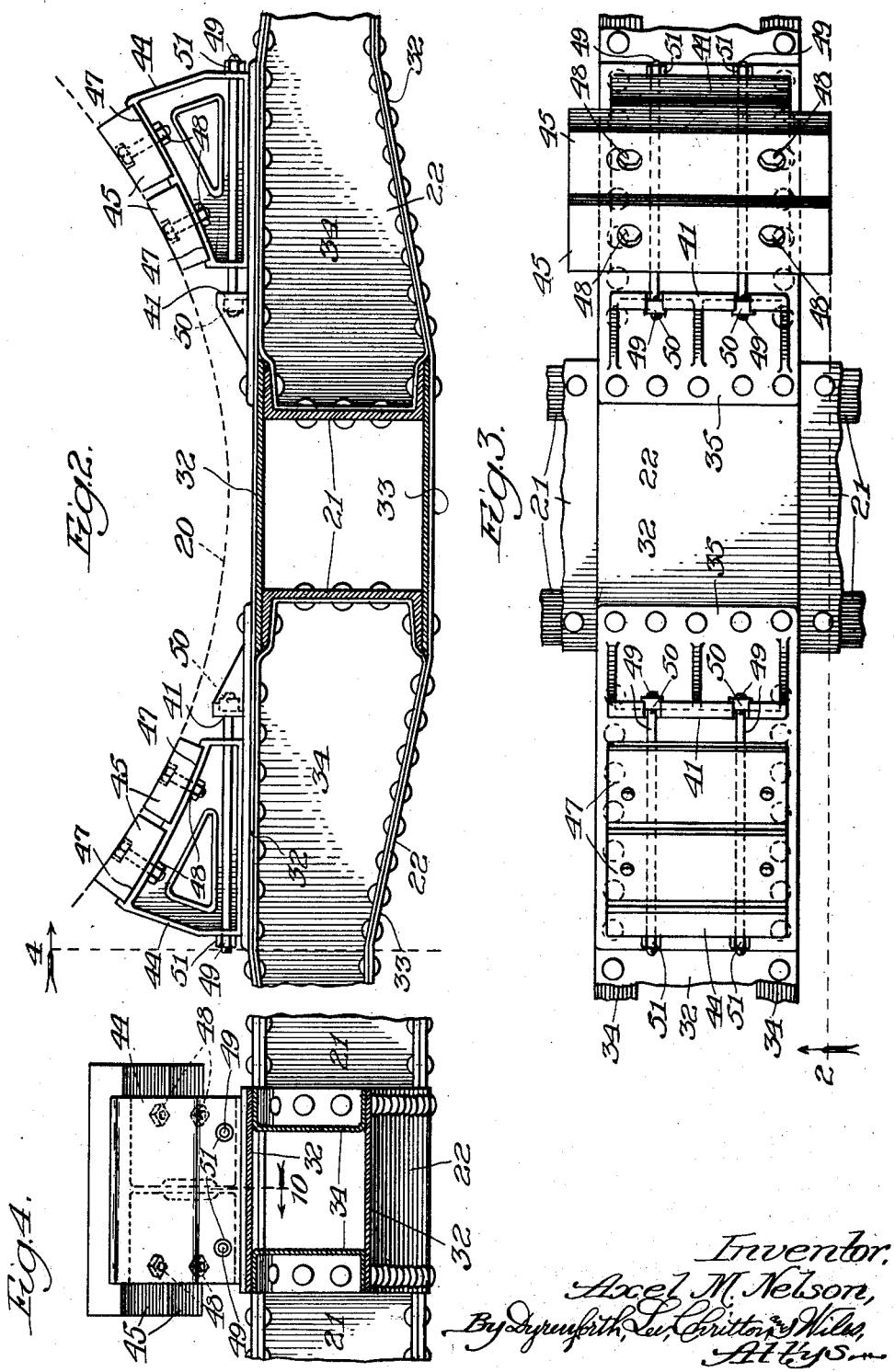

A. M. NELSON.
TANK CAR.
APPLICATION FILED MAY 19, 1922.
1,429,685.
Patented Sept. 19, 1922.
3 SHEETS—SHEET 3.
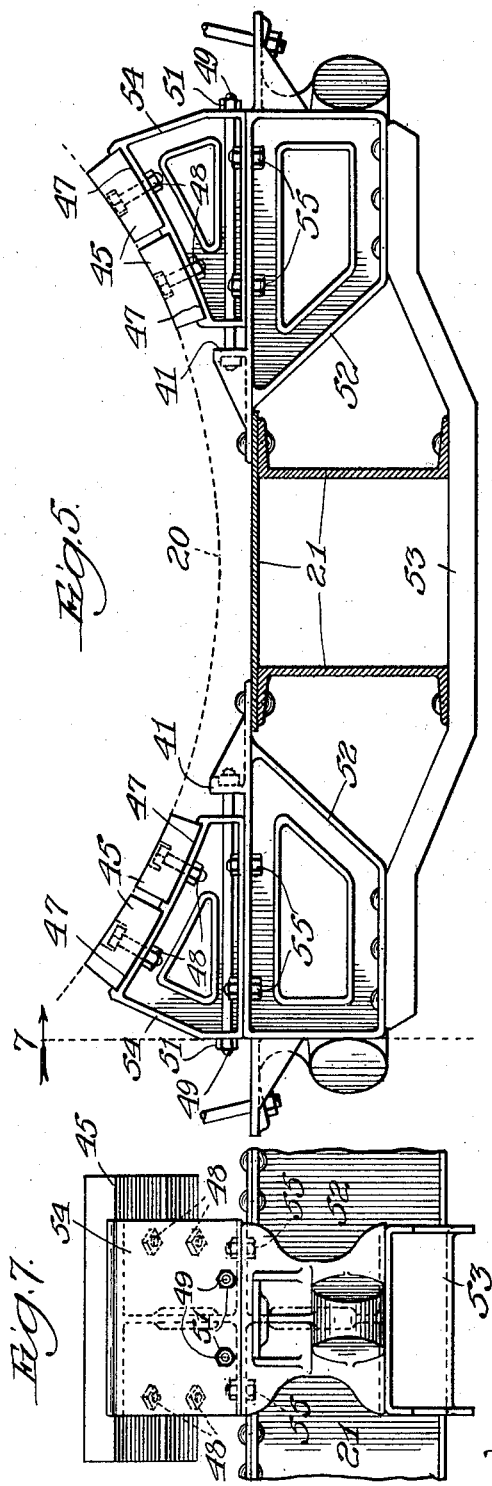
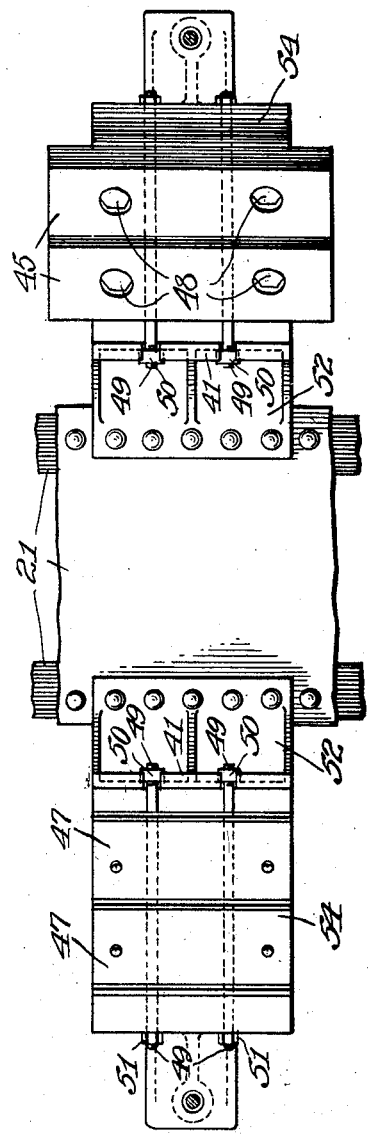
Inventor:
Axel M. Nelson, Patented Sept. 19, 1922.

1,429,685

UNITED STATES PATENT OFFICE.

AXEL M. NELSON, OF CHICAGO, ILLINOIS, ASSIGNOR TO GENERAL AMERICAN TANK CAR CORPORATION, OF CHICAGO, ILLINOIS, A CORPORATION OF WEST VIRGINIA.

TANK CAR.

Application filed May 19, 1922. Serial No. 562,145.

*To all whom it may concern:*

Be it known that I, AXEL M. NELSON, a citizen of the United States, residing at Chicago, in the county of Cook and State of Illinois, have invented a new and useful Improvement in Tank Cars, of which the following is a specification.

My invention relates to tank cars which, in accordance with common practice, are provided with means for preventing displacement of the tank portions thereof lengthwise of the cars, as for example in the form of anchorages which, while preventing the displacement referred to of the tank portions on the under frames, permit them to expand and contract under variations in temperature; and saddles, or cradles, are provided which serve to carry at least the major portion of the weight of the tank portions, it being desirable in constructions of this character that the means referred to be subjected only to the strains exerted longitudinally of the car structure.

The cradle members are commonly formed with cradle slabbing of wood, as such material has proven to be the most suitable one to be used. Wood, however, shrinks and thus draws away from the tank portions of the cars, with the result that the means preventing displacement of the tank portions lengthwise of the cars, are caused to be subjected to stresses, due to the weight of the tank portions imposed thereon, which it is desired be avoided.

It is my primary object to provide a structure of the general character above referred to wherein the cradle slabbing may be adjusted relative to the tank portions to compensate for shrinkage of the slabbing, thereby to cause the cradle portions to bear the weight of the tank portions to the desired extent, and be held in such adjusted position.

Referring to the accompanying drawings:

Figure 1 is a view in side elevation, and somewhat diagrammatic in character, of a tank car embodying my improvements. Figure 2 is a broken transverse section through the structure of Fig. 1 non-coincident with one of the body bolsters, the ends of which are broken away, the lower portion of the tank of the car being shown by a dotted line. Figure 3 is a plan view of the structure shown in Fig. 2, with the tank and the slabbing of one of the cradle members omitted. Figure 4 is a section taken at the line 4 on Fig. 2 and viewed in the direction of the arrows. Figure 5 is a view like Fig. 2 illustrating a different form of bolster and a slight modification of the cradle members. Figure 6 is a plan view of the structure shown in Fig. 5 with the slabbing of one of the cradle members omitted. Figure 7 is a view in end elevation of the structure shown in Fig. 5, the view being taken at the line 7 on Fig. 5 and viewed in the direction of the arrow. Figure 8 is a plan view of one of the sections of the cradle construction shown in Fig. 2. Figure 9 is a bottom view of another of the sections of the cradle construction of Fig. 2. Figure 10 is an enlarged broken section taken at the line 10 on Fig. 4 and viewed in the direction of the arrow; and Figure 11 an enlarged broken view taken at the line 11 on Fig. 1 and viewed in the direction of the arrow, this view showing the anchor for the tank.

Inasmuch as I have devised my invention for use more particularly in connection with tank cars of the so-called center anchorage type with the ends of the tank supported in a manner to permit them to move lengthwise of the car in the expanding and contracting of the tank, though not to the exclusion of its use in connection with car constructions wherein means of other constructions and otherwise located, for preventing displacement of the tank portions thereof lengthwise of the cars, are provided, I have shown it as embodied in a tank car of the type above referred to, a tank car of this general type being represented in Fig. 1, the tank being represented at 20, the longitudinally-extending center sill of the under frame at 21, the body bolsters at 22, and the center anchorage at 23. The particular anchorage means shown comprises the members 24 which extend lengthwise of the car structure, these members being secured at horizontal flanges 25 to the center sill 21 and being provided with tank-seating portions 26 and depending flanges 27, the members 24 being connected, as by the rivets 28, with the depending flanges 29 of angle bars 30 rigidly secured to the bottom wall of the tank 23 as through the medium of the rivets 31.

In accordance with common practice the ends of the tank 20 are supported to relieve the anchorage 23 of at least the major portion of the weight of the tank 20, while permitting the ends of the tank to shift in expanding and contracting, these means being in the form of cradles the upper portions of which are in the form of slabbing and upon which the end portions of the tank rest.

Referring now more particularly to the construction shown in Figs. 2, 3, 4, 8, 9 and 10, this structure is illustrative of one embodiment of my invention as applied to bolsters of the so-called diaphragm, or pan, type wherein the body bolster is formed of an upper, substantially horizontal plate-like member 32 extending across the center sill 21, a lower plate-like portion 33 extending across the under side of the sill 21, and intermediate, or web, members 34, the members 32, 33 and 34, together with the sill 21, being rigidly riveted together all in accordance with common practice. The cradle means carried by the bolster are shown as formed of members 35 having plate-like portions 36 each containing along opposite edges and an end thereof series of rivet-receiving apertures 37, 38 and 39 and containing along its center line at the end thereof opposite that containing openings 38, a series of elongated slots 40. The member 35 is also formed with an upwardly-extending flange 41 extending crosswise of the plate portion 36 and reenforced with webs 42, the flange 41 containing apertures 43 extending lengthwise of the members 35. The members 35 are positioned on the upper plate portions 32 of the bolsters 22 and are securely riveted thereto by rivets located in the openings 37, 38 and 39 engaging the underlying portions of the bolsters 22, the members 35 extending lengthwise of the bolsters and extending at opposite sides of the center sill 21, the members 35 for each bolster being reversely positioned as shown in Figs. 2 and 3, whereby their flanged portions 41 extend adjacent the center sill 21. The rivets which are located in the openings 37 and 39 of the members 35 are countersunk to extend flush with the upper surfaces of these members which latter form bearing plates for members 44 which carry the slabbing represented at 45, and are adjustable on the members 35 in a direction crosswise of the tank. The members 44 are shown as castings provided with depending lugs 46 which extend into the slots 40 and which while serving to prevent movement of the members 44 in a direction lengthwise of the car structure, permit of the adjustment of the latter crosswise thereof. The upper surfaces of the members 44 at which the slabbing 45 is supported, are preferably generally inclined as shown, and formed with grooves 47 extending lengthwise of the tank and in which the slabbing is positioned, the latter being held in place as by means of the bolts represented at 48.

In accordance with the illustrated preferred embodiment of my invention I provide the bolts 49 which extend through openings in the members 44 and through the openings 43 in the members 35 and engage at their head and nut portions 50 and 51, respectively, with the flange 41 and the outer surfaces of the members 44, these bolts serving as means for adjusting the members 44 toward the center line of the tank, and holding them in adjusted position.

In the arrangement shown in Figs. 5, 6 and 7 the invention is applied to a construction of body bolster involving skeleton castings at its opposite ends which form the upper portions and the vertically-disposed web portions of the bolster, these castings being represented at 52 and forming with the sill 22 and the member 53 extending across the under side of the sill 22, the bolster construction, the members 52 and 53 being riveted together and to the sill 22 as shown. In this particular construction the upper portion of each member 52 is of the same construction as the member 35 of the preceding figures, corresponding numerals being applied thereto in the drawings, except that the rows of rivet holes 37 and 39 shown in Fig. 8 are omitted, and instead of providing two of the slots 40 as shown in Figs. 8 and 10, four of these slots are provided, two at each side of the medial line of the member 52. Cooperating with the members 52 are cradle members 54 which are supported upon the upper surfaces of the members 52 and are of the same construction as the members 44 except that instead of providing two of the depending lugs shown at 46 in Figs. 9 and 10, four of these lugs are provided so positioned as to extend into the slots above referred to in the members 52 and cooperate therewith in the same way, and for the same purpose as the lugs 46 cooperate with the slots 40 in Figs. 8, 9 and 10, it being understood that the members 54 which carry the slabbing 45, are adjustable crosswise of the tank of the car for the purpose hereinbefore explained of the members 44, the construction now being described also involving the use of the bolts 49 cooperating with the members 52 and 54 as stated of the previously-described construction.

The structure is also, and by preference, provided with bolts 55 which extend through the slots hereinbefore referred to as provided in the upper surfaces of the members 52, and upwardly through the hereinbefore described depending lugs carried by the members 54 and extending into these slots, these bolts forming means, in addition to the bolts 49, for holding the members 54 in adjusted position.

It will be understood from the foregoing that should the cradle slabbing 45 shrink and thus draw away from the tank, with the result of subjecting the tank anchorage to stresses which it is desirable be avoided, the adjustable members carrying the slabbing may be adjusted toward the center line of the tank to compensate for the shrinkage of the slabbing, and cause them to occupy such a position relative to the tank and the portions of the structure beneath these members, that the anchorage for the tank will be relieved of those stresses to which it would be subjected were such adjustments not made.

While I have illustrated and described certain forms in which my invention may be embodied, I do not wish to be understood as intending to limit it thereto, as the same may be variously modified and altered without departing from the spirit of the invention, and the invention may be embodied in other forms, if desired.

What I claim as new, and desire to secure by Letters Patent, is:

1. In a tank car, the combination of a tank-portion, an under frame, means for preventing displacement of said tank-portion on said under frame in a direction lengthwise of the car, cradle means interposed between said tank portion and said under frame and adjustable crosswise of the tank, and means holding said cradle means in adjusted position.

2. In a tank car, the combination of a tank-portion, an under frame, anchorage means rigid with said tank portion and engaging said under frame for preventing displacement of said tank portion on said under frame in a direction lengthwise of the car, cradle means interposed between said tank portion and said under frame and adjustable crosswise of the tank, and means holding said cradle means in adjusted position.

3. In a tank car, the combination of a tank-portion, an under frame, anchorage means rigid with said tank portion between the ends of the latter and engaging said under frame for preventing displacement of said tank portion on said under frame in a direction lengthwise of the car, cradle means located at opposite sides of said anchorage means and interposed between said tank-portion and said under frame and adjustable crosswise of the tank, and means holding said cradle means in adjusted position.

4. In a tank car, the combination of a tank-portion, an under frame having a bolster, means for preventing displacement of said tank portion on said under frame in a direction lengthwise of the car, cradle means carried by said bolster and interposed between said tank portion and said under frame and adjustable crosswise of the tank, and means holding said cradle means in adjusted position.

5. In a tank car, the combination of a tank-portion, and under frame, means for preventing displacement of said tank portion on said under frame in a direction lengthwise of the car, cradle means provided with slabbing at its upper portion, said cradle means being interposed between said tank-portion and said under frame and adjustable crosswise of the tank, and means holding said cradle means in adjusted position.

6. In a tank car, the combination of a tank-portion, an under frame, means for preventing displacement of said tank portion on said under frame in a direction lengthwise of the car, cradle means interposed between said tank-portion and said under frame and comprising a base member, a member adjustable along said base member in a direction crosswise of the car, means guiding said last-named member in its movements relative to said base member, and means for holding said second-named member in adjusted position.

7. In a tank car, the combination of a tank-portion, an under frame, means for preventing displacement of said tank-portion on said under frame in a direction lengthwise of the car, cradle means interposed between said tank-portion and said under frame and comprising a base member, a member adjustable along said base member in a direction crosswise of the car, said members having stud and slot engagement for guiding said second-named member in its movements relative to said base member, and means for holding said second-named member in adjusted position.

8. In a tank car, the combination of a tank-portion, an under frame having a bolster, means for preventing displacement of said tank-portion on said under frame in a direction lengthwise of the car, cradle members carried by said bolster and interposed between said under frame and adjustable crosswise of the tank, and means holding said cradle members in adjusted position.

9. In a tank car, the combination of a tank-portion, an under frame having a bolster, means for preventing displacement of said tank-portion on said under frame in a direction lengthwise of the car, cradle means at opposite sides of the center of the tank, each of said cradle means being formed of a member constituting a part of the bolster, and a second member adjustable on said first-named member crosswise of the car, said second-named members being interposed between said first-named members and said tank-portion, and means holding said second-named members in adjusted position.

10. In a tank car, the combination of a tank-portion, an under frame having a bolster, means for preventing displacement of said tank-portion on said under frame in a direction lengthwise of the car, cradle means carried by said bolster interposed between said tank-portion and said bolster, said means being located at opposite sides of the center line of the tank and each comprising a member carried by said bolster and a second member adjustable on said first-named member in a direction crosswise of the tank, and means holding said second-named members in adjusted position.

AXEL M. NELSON.